US009185191B2

(12) United States Patent
Yen et al.

(10) Patent No.: US 9,185,191 B2
(45) Date of Patent: *Nov. 10, 2015

(54) UNIFIED NETWORK ARCHITECTURE BASED ON MEDIUM ACCESS CONTROL ABSTRACTION SUB-LAYER

(75) Inventors: Chia-Wei Yen, Taipei (TW); Jian-Li Mao, Suzhou (CN)

(73) Assignee: MEDIATEK INC., Science-Based Industrial Park, Hsin-Chu (TW)

(*) Notice: Subject to any disclaimer, the term of this patent is extended or adjusted under 35 U.S.C. 154(b) by 418 days.

This patent is subject to a terminal disclaimer.

(21) Appl. No.: 13/523,869

(22) Filed: Jun. 14, 2012

(65) Prior Publication Data

US 2012/0324081 A1    Dec. 20, 2012

Related U.S. Application Data

(60) Provisional application No. 61/497,526, filed on Jun. 16, 2011, provisional application No. 61/515,982, filed on Aug. 8, 2011.

(51) Int. Cl.
*H04L 29/06* (2006.01)
*G06Q 50/00* (2012.01)
*H04W 4/20* (2009.01)
*H04L 29/08* (2006.01)

(52) U.S. Cl.
CPC ............... *H04L 69/18* (2013.01); *G06Q 50/01* (2013.01); *H04L 67/306* (2013.01); *H04W 4/206* (2013.01)

(58) Field of Classification Search
CPC .. H04L 49/9063; H04L 49/9068; H04L 69/18

USPC .................................................. 709/204, 225
See application file for complete search history.

(56) References Cited

U.S. PATENT DOCUMENTS

| 6,041,063 | A  | * | 3/2000  | Povlsen et al. ........... 370/395.53 |
| 6,240,188 | B1 |   | 5/2001  | Dondeti |
| 6,560,234 | B1 | * | 5/2003  | Ben-Michael et al. ....... 370/401 |
| 8,060,092 | B2 | * | 11/2011 | Kim .............................. 455/436 |
| 2003/0163578 | A1 | * | 8/2003 | Gao ............................. 709/230 |
| 2004/0125744 | A1 | * | 7/2004 | Perrot et al. .................. 370/212 |

(Continued)

FOREIGN PATENT DOCUMENTS

| CN | 101272375 A | 9/2008 |
| CN | 102694790 A | 9/2012 |

(Continued)

*Primary Examiner* — Joe Chacko
(74) *Attorney, Agent, or Firm* — Winston Hsu; Scott Margo

(57) ABSTRACT

A unified network architecture based on a medium access control (MAC) abstraction sub-layer for converging a plurality of communication standards is disclosed. The unified network architecture in a control plane comprises a first unified terminal device comprising a unified management entity in the MAC abstraction sub-layer, for mapping a unified parameter from an upper layer to a first MAC type parameter for a configuration of a first MAC type of a MAC layer complied with a first communication standard of the plurality of communication standards, and a service management entity service access point, hereafter called SME SAP, arranged between the MAC abstraction sub-layer and a service management entity (SME) of the MAC layer, wherein the unified management entity communicates with the SME via the SME SAP for setting the first MAC type parameter into the first MAC type of the MAC layer.

11 Claims, 5 Drawing Sheets

(56) References Cited

U.S. PATENT DOCUMENTS

| | | |
|---|---|---|
| 2004/0218586 A1 | 11/2004 | Khoury |
| 2004/0246993 A1* | 12/2004 | An .................................. 370/469 |
| 2005/0238025 A1* | 10/2005 | Hay et al. ................... 370/395.1 |
| 2006/0083227 A1* | 4/2006 | Eldar ............................. 370/389 |
| 2006/0277315 A1 | 12/2006 | Garcia |
| 2007/0173283 A1 | 7/2007 | Livet |
| 2008/0130640 A1 | 6/2008 | Hurwitz |
| 2008/0170531 A1* | 7/2008 | Petry et al. .................... 370/312 |
| 2009/0047963 A1 | 2/2009 | Kim |
| 2011/0103309 A1* | 5/2011 | Wang et al. ................... 370/328 |
| 2012/0243556 A1 | 9/2012 | Yen |
| 2012/0311683 A1* | 12/2012 | Klein et al. ........................ 726/6 |
| 2013/0258946 A1* | 10/2013 | Yie et al. ....................... 370/328 |

FOREIGN PATENT DOCUMENTS

| | | |
|---|---|---|
| TW | 200814553 | 3/2008 |
| TW | 201110646 | 3/2011 |

* cited by examiner

UNIFIED NETWORK ARCHITECTURE BASED ON MEDIUM ACCESS CONTROL ABSTRACTION SUB-LAYER

CROSS REFERENCE TO RELATED APPLICATIONS

This application claims both the benefit of U.S. Provisional Application No. 61/497,526, filed on Jun. 16, 2011, entitled "Unified Network Architecture Based on MAC Abstraction Sub-layer", and the benefit of U.S. Provisional Application No. 61/515,982, filed on Aug. 8, 2011, entitled "Unified Network Architecture Based on MAC Abstraction Sub-layer", the contents of which are incorporated herein in their entirety.

BACKGROUND

With rapidly growing of user's needs for accessing digital contents everywhere, various communication technologies have been developed for transmission of the digital contents. These communication technologies may be developed for different environments, different transmission speeds and/or different user requirements. In addition, several medium access control (MAC)/physical (PHY) protocols are established based on different communication standards, which define different communication methods based on heterogeneous mediums. For example, IEEE 1901 communication standard is used for power line (PLC), IEEE 802.11 communication standard is used for wireless communication (i.e. WiFi), IEEE 802.3 communication standard is used for Ethernet, and Multimedia over Coax Alliance (MoCA) communication standard is used for coaxial cables, and so on.

As a result, a MAC abstraction sub-layer is developed for converging these various communication standards. Please refer to FIG. 1, which is a schematic diagram of an exemplary communication device 10 in a data plane. The communication device 10 may be a mobile phone, laptop, tablet computer, electronic book, modem, or portable computer system, and uses various communication standards for communication. In FIG. 1, the MAC abstraction sub-layer is arranged between an upper layer and a plurality of MAC types of a MAC layer corresponding to a plurality of communication standards. The upper layer can be a network layer, a transport layer, an application layer or any layer responsible for processing the signalings and the packets received from the MAC abstraction sub-layer, and signalings and packets to be transmitted via the MAC abstraction sub-layer. The plurality of MAC types of the MAC layer include 802.3 MAC, 802.11 MAC, 1901 MAC and MoCA MAC complied with to the IEEE 802.3 communication standard, IEEE 802.11 communication standard, IEEE 1901 communication standard and MoCA communication standard, respectively. Further, each of the MAC types of the MAC layer includes a service access point (SAP), such that the MAC abstraction sub-layer can communicate with the MAC layer via the corresponding SAPs.

For example, when there is a packet arriving at the 802.11 MAC, the MAC abstraction sub-layer receives the packet via the SAP of the 802.11 MAC. Alternatively, when there is a packet arriving at the MAC abstraction sub-layer and is needed to be transmitted to the 1901 MAC, the MAC abstraction sub-layer transmits the packet via the SAP of the 1901 MAC. In addition, the communication device 10 in the data plane includes a plurality of PHY types of a PHY layer. The plurality of PHY types of the PHY layer include an 802.3 PHY, an 802.11 PHY, a 1901 PHY and a MoCA PHY, which is complied with the IEEE 802.3 communication standard, IEEE 802.11 communication standard, IEEE 1901 communication standard and MoCA communication standard, respectively. Thus, the packet of the 802.11 MAC, 802.3 MAC, 1901 MAC or MoCA MAC can be received/transmitted through a corresponding PHY type of the PHY layer.

However, with current MAC abstraction sub-layer architecture, it is incapable of providing a unified configuration experience to users due to various MAC types of the MAC layer (e.g. 802.3 MAC, 802.11 MAC, 1901 MAC and MoCA MAC). More specifically, it is difficult for a user to set the communication device 10 compatible of the MAC abstraction sub-layer because each MAC type of the MAC layer has a dedicated MAC parameter setting (e.g. format, length, etc). A user has to individually set the MAC parameters to conform with the parameter settings of the MAC types, causing inconvenience user experience.

SUMMARY

The present invention therefore provides a unified network architecture based on medium access control abstraction sub-layer, to solve the abovementioned problems.

A unified network architecture based on a medium access control (MAC) abstraction sub-layer for converging a plurality of communication standards is disclosed. The unified network architecture in a control plane comprises a first unified terminal device comprising a unified management entity in the MAC abstraction sub-layer, for mapping a unified parameter from an upper layer to a first MAC type parameter for a configuration of a first MAC type of a MAC layer complied with a first communication standard of the plurality of communication standards, and a service management entity service access point, hereafter called SME SAP, arranged between the MAC abstraction sub-layer and a service management entity (SME) of the MAC layer, wherein the unified management entity communicates with the SME via the SME SAP for setting the first MAC type parameter into the first MAC type of the MAC layer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
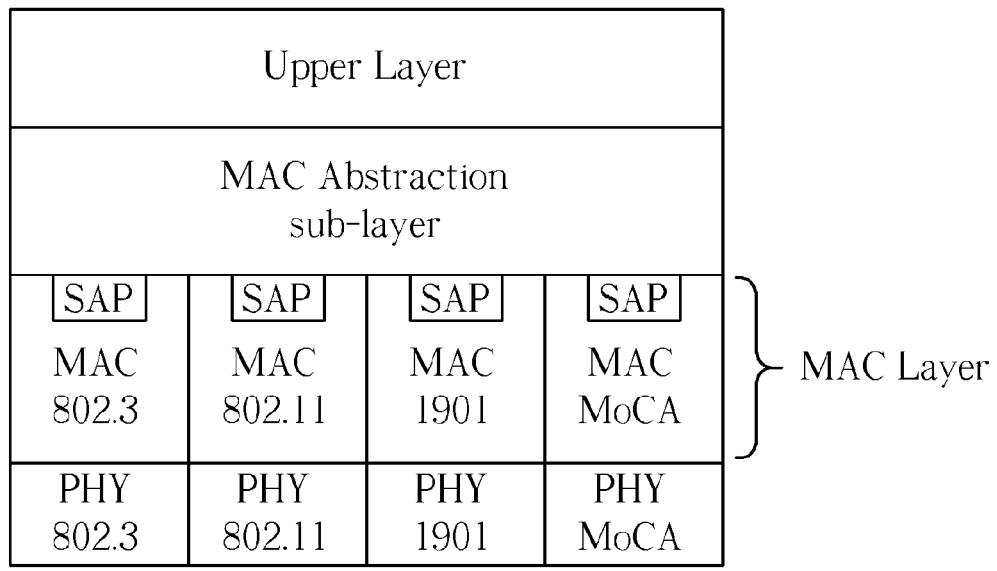
FIG. 1 is a schematic diagram of a communication device according to the prior art.
Figure 2:
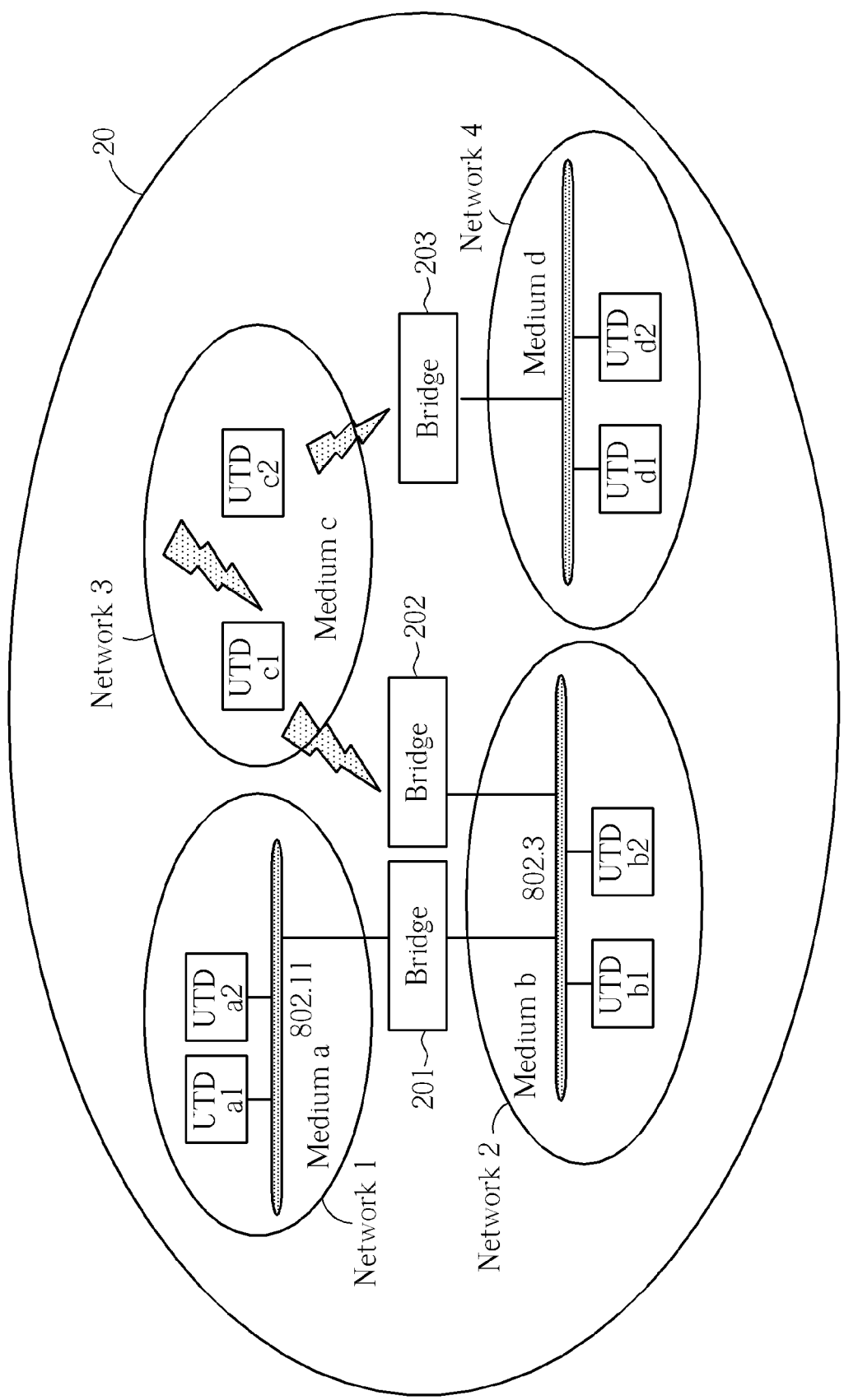
FIG. 2 is a schematic diagram of an exemplary unified network system according to the present invention.

Please refer to FIG. 2, which is a schematic diagram of an exemplary unified network system 20 according to the present invention. In FIG. 2, the unified network system 20 includes networks 1-4 each complied with a communication standard, such as IEEE 1901, IEEE 802.11, IEEE 802.3 or Multimedia over Coax Alliance (MoCA), and bridges 201-203 for communications between the networks 1-4. Every communication standard defines a communication method based on a medium. For example, IEEE 1901 is used for power line (PLC), IEEE 802.11 is used for wireless communication (i.e. WiFi), IEEE 802.3 is used for Ethernet, and Multimedia over Coax Alliance (MoCA) is used for coaxial cables. Therefore, within the network 1, unified terminal devices (UTDs) a1-a2 communicate to each other or to the network 1 via a medium Medium a. Within in the network 2, unified terminal devices b1-b2 communicates to each other or to the network 2 via a medium Medium b, and so on. Further, the unified terminal devices a1-a2, b1-b2, c1-c2, and d1-d2 with different communication mediums communicate with others via the bridges 201-203. For instance, unified terminal devices b1-b2 communicate with unified terminal devices a1-a2 via bridge 201, communicate with unified terminal devices c1-c2 via the bridge 202, and unified terminal devices d1-d2 communicate with unified terminal devices c1-c2 via the bridge 203. Note that, the unified terminal devices a1-a2, b1-b2, c1-c2, and d1-d2 can be mobile phones, laptops, tablet computers, electronic books, modems, and portable computer systems, etc.

Figure 3:
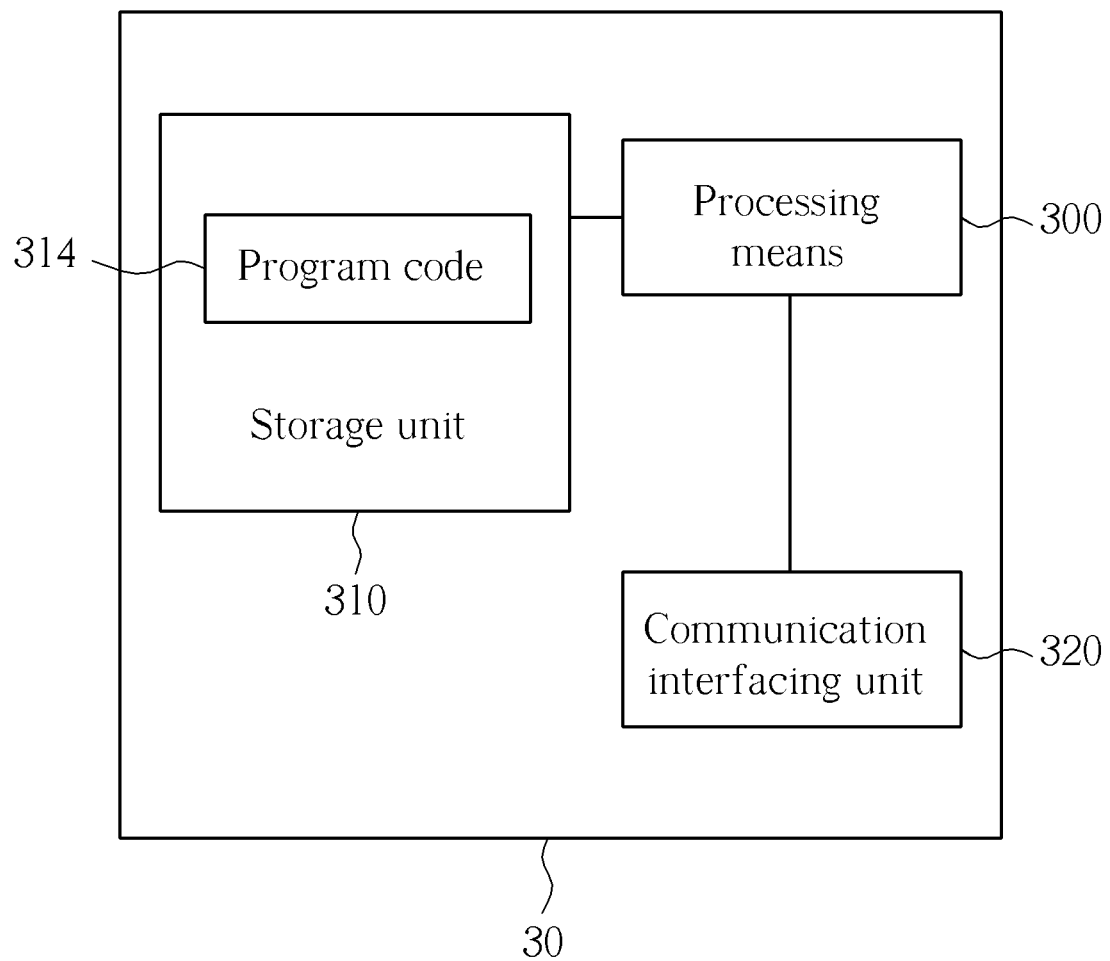
FIG. 3 is a schematic diagram of an exemplary communication device according to the present invention.

Please refer to FIG. 3, which is a schematic diagram of an exemplary communication device 30 according to the present invention. The communication device 30 can be a unified terminal device shown in FIG. 2. The communication device 30 may include a processor 300 such as a microprocessor or an Application Specific Integrated Circuit (ASIC), a storage unit 310 and a communication interfacing unit 320. The storage unit 310 may be any data storage device that can store a program code 314, accessed by the processor 300. Examples of the storage unit 310 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 320 is preferably a transceiver and can exchange signals with a unified terminal device or the network according to processing results of the processor 300.

Figure 4:
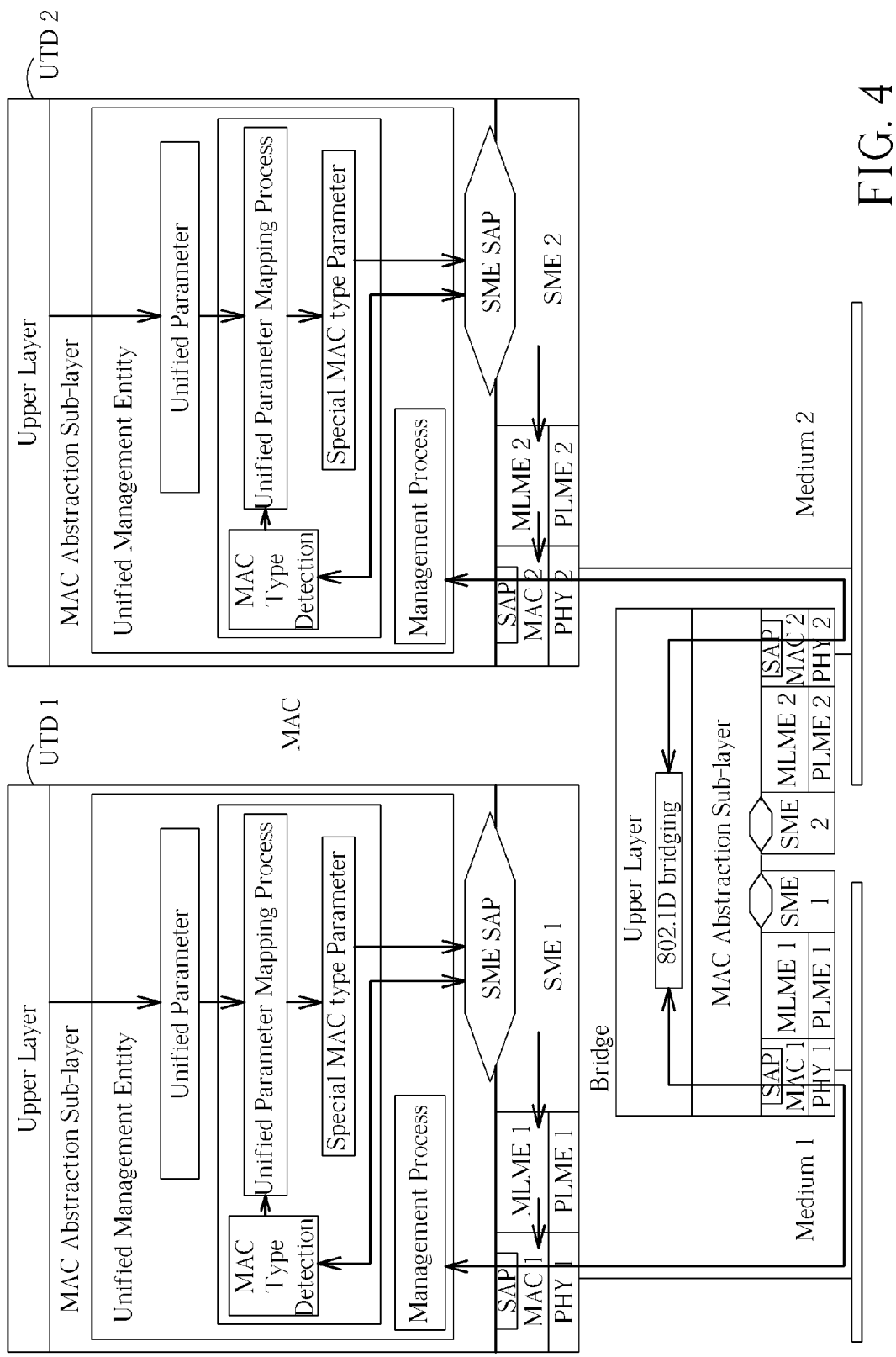
FIG. 4 is a schematic diagram of a unified network architecture in a control plane.

Please refer to FIG. 4, which is a schematic diagram of a unified network architecture in a control plane. In FIG. 4, two unified terminal devices UTD 1 and UTD 2 and a bridge B1 are simply utilized for illustrating the structure of the unified network system of FIG. 2. The bridge B1 includes an upper layer, a medium access control (MAC) abstraction sub-layer, service management entities SME 1 and SME2 each complied with a communication standard, MAC layer management entities MLME 1 and MLME 2, physical layer management entities PLME 1 and PLME 2, MAC types MAC 1, MAC 2 of a MAC layer each including a service access point (SAP), physical types PHY 1, PHY 2 of a physical layer. Note that, the MAC type MAC 1 or the MAC type MAC 2 of the bridge B1 may be 1901 MAC, 802.11 MAC, 802.3 MAC or MoCA MAC, which complied with IEEE 1901, IEEE 802.11, IEEE 802.3 or MoCA.

On the other hand, the unified terminal devices UTD 1 and UTD 2 each includes an upper layer, a MAC abstraction sub-layer, a service management entity SME 1/SME 2, a MAC layer management entity MLME 1/MLME 2, a physical layer management entity PLME 1/PLME 2, a MAC type MAC 1/MAC 2 of a MAC layer including a service access point and a PHY type PHY 1/PHY 2 of a physical layer. In addition, the MAC type MAC 1 of the unified terminal device UTD 1 or the MAC type MAC 2 of the unified terminal device UTD 2 may be 1901 MAC, 802.11 MAC, 802.3 MAC or MoCA MAC, which complied with IEEE 1901, IEEE 802.11, IEEE 802.3 or MoCA. Functionalities and operations of abovementioned protocol layers shall be well-known in the art, so it is not given herein.

Note that, the main idea of the present invention is to provide a user with a unified configuration experience based on the MAC abstraction sub-layer. In order to achieve this goal, a unified management entity (UME) is provided to implement the MAC abstraction sub-layer. In addition, a service management entity service access point (SME SAP) is arranged between the MAC abstraction sub-layer and the service management entity SME 1/SME 2. The SME SAP is an interface for the unified management entity to communicate with the service management entity SME 1/SME 2. In addition, the service management entity SME 1/SME 2 can communicate with the MAC type MAC 1/MAC 2 of the MAC layer via the MAC layer management entity MLME 1/MLME 2. In a word, the unified management entity of the MAC abstraction sub-layer interacts with the underlying MAC layer through the SME SAP.

As to an operation of the unified management entity, the unified management entity maps a unified parameter from an upper layer (i.e. set by a user through a user interface) to a special MAC type parameter conformed to a MAC parameter setting (i.e. format/length) of the MAC type MAC 1/MAC 2. In other words, the unified management entity transforms the unified parameter into a certain MAC type parameter for configuration of the MAC type MAC 1/MAC 2. For the unified parameter mapping process, the unified management entity further detects a MAC type of the MAC layer via the SME SAP. The detailed description is as following.

Figure 5:
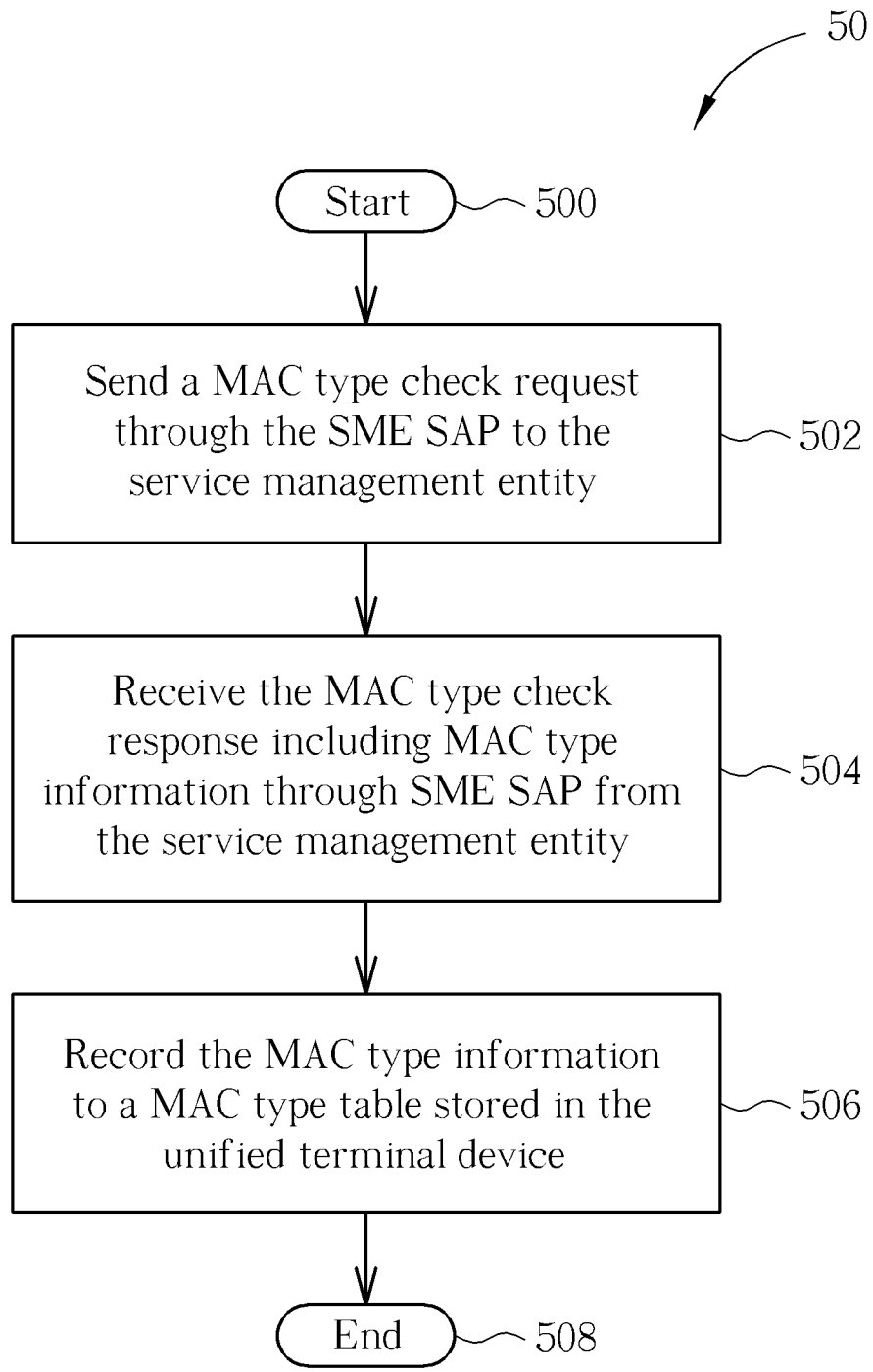
FIG. 5 is a flowchart of a MAC type detection process according to the present invention.

Please refer to FIG. 5, which is a flowchart of a process 50 according to an example of the present invention. The process 50 is utilized in a unified management entity of a unified terminal device shown in FIG. 4, for detecting the MAC type of the MAC layer. The process 50 may be compiled into the program code 214 of FIG. 3 and includes the following steps:

Step 500: Start.

Step 502: Send a MAC type check request through the SME SAP to the service management entity.

Step 504: Receive the MAC type check response including MAC type information through SME SAP from the service management entity.

Step 506: Record the MAC type information to a MAC type table stored in the unified terminal device.

Step 508: End.

According to the process 50, the unified management entity detects the MAC type of the underlying MAC layer by sending the MAC type check message to the service management entity. As abovementioned, the unified management entity and the service management entity are communicated via the SME SAP, and thereby the unified management entity transmits and receives the MAC type check message and the MAC type check response through the SME SAP. In addition, the unified management entity shall records the MAC type information into the MAC type table (i.e. stored in the storage unit 310 of FIG. 3). Besides, the unified management entity updates the MAC type table with the obtained MAC type information. By knowing the MAC type of the MAC layer, the unified management entity is able to map the unified parameter to a correct MAC type parameter, and then sets the MAC layer via the SME SAP.

Take an example based on the above description. A user input a unified network identification (UNID), which is a unique network identification for the unified network system 20 of FIG. 2, and a length of the UNID is 0-64 octets. If the unified management entity of the unified terminal device UTD 1 detects that the MAC type MAC 1 is 802.11 MAC (namely WiFi), the unified management entity outputs SSID, 0-32 octets (i.e. if UNID>32 octets, use the first 32 octets of UNID as SSID; else the content of SSID is the same with UNID). If the unified management entity detects that the MAC type is 802.3 MAC (namely Ethernet), the unified management entity outputs none. If the unified management entity detects that the MAC type is 1901 MAC (namely PLC), the unified management entity outputs NPW, 8-64 octets (i.e. the content of NPW is the same with UNID). As can be seen, unified management entity automatically transforms a unified configuration to a certain MAC type configuration according to the MAC type detection result, and thereby provides the same configuration experience to the users no matter what MAC type of the MAC layer is.

Further, unified management entity performs management process (e.g. device management, or negotiate QoS parameters) to deal with management frame and to implement management function between unified terminal devices. In detail, referring back to FIG. 4, the unified management entity of the unified terminal device UTD 1 generates a management packet, and transmits the management packet to the bridge B1 through a first data path, and thereby the bridge transmits the received management packet to the unified terminal device UTD 2 through a second data path. The first data path is from a MAC SAP of the unified terminal device UTD 1, a MAC/PHY layer of the unified terminal device UTD 1, PHY/MAC layer of the bridge B1, a MAC SAP of the bridge, to the upper layer of the bridge. The second data path is from the upper layer of the bridge B1, a MAC SAP of the bridge B1, a MAC/PHY layer of the bridge B1, to PHY/MAC layer of the unified terminal device UTD 2. Thus, the unified management entities can exchange management frame via the data path with the bridge B1.

Please note that, those skilled in the art may realize the unified parameter mapping process, MAC type detection process, and/or management process by means of software, hardware or their combinations. More specifically, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides unified network architecture in a control plane to convenient user's using experience. More specifically, a user only configures a unified MAC parameter for different MAC type parameter settings without consideration of the MAC type of the MAC layer. Thus the user does not need to set the MAC layer with different MAC type separately, so as to providing the user with a unified configuration experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A unified network architecture based on a medium access control (MAC) abstraction sub-layer for converging a plurality of communication standards, the unified network architecture in a control plane comprising:
   a first unified terminal device (UTD) comprising:
   a storage unit storing program code;
   a processor accessing and executing the program code stored in the storage unit;
   a unified management entity (UME) in the MAC abstraction sub-layer, for mapping a unified parameter from an upper layer to a first MAC type parameter for a configuration of a first MAC type of a MAC layer complied with a first communication standard of the plurality of communication standards; and
   a service management entity service access point, hereafter called SME SAP, arranged between the MAC abstraction sub-layer and a service management entity (SME) of the MAC layer, wherein the unified management entity communicates with the SME via the SME SAP for setting the first MAC type parameter into the first MAC type of the MAC layer.

2. The unified network architecture of claim 1, wherein the unified management entity further used for detecting the first MAC type of the MAC layer via the SME SAP.

3. The unified network architecture of claim 2, wherein the unified management entity sends a MAC type check request through the SME SAP to the SME, and receives the MAC type check response including MAC type information associated to the first MAC type through the SME SAP from the SME.

4. The unified network architecture of claim 3, wherein the unified management entity further records the MAC type information to a MAC type table stored in the first unified terminal device.

5. The unified network architecture of claim 3, wherein the unified management entity maps the unified parameters from the upper layer to the first MAC type parameters according to the MAC type information.

6. The unified network architecture of claim 1, wherein the SME communicates with the first MAC type of the MAC layer via a MAC layer management entity (MLME) to set the first MAC type parameter into the first MAC type of the MAC layer.

7. The unified network architecture of claim 1, wherein the first communication standard includes IEEE 802.3 communication standard, IEEE 802.11 communication standard, IEEE 1901 communication standard or Multimedia over Coax Alliance (MoCA) communication standard.

8. The unified network architecture of claim 7, wherein the first MAC type includes 802.3 MAC, 802.11 MAC, 1901 MAC, or MoCA MAC.

9. The unified network architecture of claim 1, wherein the unified management entity further used for performing management function between the first unified terminal device and a second unified terminal device.

10. The unified network architecture of claim 9, wherein the unified network architecture further comprises a bridge between the first unified terminal device and the second unified terminal device, and the unified management entity generates a management packet for the second unified terminal device, and then transmits the management packet to the bridge through a first data path, and thereby the bridge transmits the received management packet to the second unified terminal device through a second data path.

11. The unified network architecture of claim 10, wherein the first data path is from a first type MAC SAP, a first type MAC/PHY layer of the first unified terminal device, first type PHY/MAC layer of the bridge, a first type MAC SAP of the bridge, to the upper layer of the bridge, and the second data path is from the upper layer of the bridge, a second type MAC SAP of the bridge, a second type MAC/PHY layer of the bridge, to second type PHY/MAC layer of second unified terminal device.

* * * * *